US012715014B2

(12) United States Patent
Carter

(10) Patent No.: US 12,715,014 B2
(45) Date of Patent: Aug. 25, 2026

(54) WATER IRRIGATION SYSTEMS AND METHODS

(71) Applicant: Charles Carter, Austin, TX (US)

(72) Inventor: Charles Carter, Austin, TX (US)

(73) Assignee: Charles Carter, Austin, TX (US)

( * ) Notice: Subject to any disclaimer, the term of this patent is extended or adjusted under 35 U.S.C. 154(b) by 156 days.

(21) Appl. No.: 18/817,856

(22) Filed: Aug. 28, 2024

(65) Prior Publication Data

US 2026/0061448 A1 Mar. 5, 2026

(51) Int. Cl.
*B05B 15/65* (2018.01)
*B05B 15/68* (2018.01)

(52) U.S. Cl.
CPC .............. *B05B 15/65* (2018.02); *B05B 15/68* (2018.02)

(58) Field of Classification Search
CPC ........ B05B 15/65; B05B 15/68; B05B 15/622; B05B 15/74
See application file for complete search history.

(56) References Cited

U.S. PATENT DOCUMENTS 2,768,029 A * 10/1956 Stinson, Jr. ............. B05B 15/74 239/206
5,938,121 A * 8/1999 Ferguson ................ B05B 15/74 239/203
6,488,218 B1 * 12/2002 Townsend ............... B05B 15/74 239/203
8,167,221 B2 * 5/2012 McAfee ................. A01G 25/06 285/133.11
8,246,082 B2 * 8/2012 Stewart .................. A01G 25/02 285/298
10,518,287 B1 * 12/2019 Paquin ................... A01G 25/06
2009/0108098 A1 * 4/2009 Soulakis ............... B05B 15/654 239/203
2014/0290028 A1 * 10/2014 Ishaya ................... B05B 15/622 29/428
2020/0230637 A1 * 7/2020 Nachawi ................. F16L 33/24
2022/0258195 A1 * 8/2022 McIver ................. B05B 15/622

OTHER PUBLICATIONS

[No Author Listed] [online], "How to Switch Hunter MP Rotator Sprinklers|SprinklerSupplyStore.com," Sprinkler Nerd Andy, Apr. 22, 2021, retrieved on Aug. 30, 2024, retrieved from URL <https://www.youtube.com/watch?v=p_j4HkiGutU>, 173 pages.

(Continued)

*Primary Examiner* — Steven M Cernoch
(74) *Attorney, Agent, or Firm* — Fish & Richardson P.C.

(57) ABSTRACT

A sprinkler head adapter includes a body that includes an inlet connection and a riser. The inlet connection is configured to threadingly couple directly to an outlet connection of a swing joint assembly. The inlet connection includes a ¾ inch female pipe thread (FPT) connection. The riser is integrally formed with the inlet connection and includes a plurality of riser sections. Each riser section includes a threaded portion and a cut-off shoulder. Each threaded portion includes a ½ inch male pipe thread (MPT) connection. The sprinkler head adapter includes a bore formed through the body and configured to flow an irrigation liquid therethrough.

20 Claims, 5 Drawing Sheets

(56) References Cited

OTHER PUBLICATIONS

OrbitOnline.com [online], "Cut-Off Sprinkler Risers; Part #: 3711," retrieved on Jan. 15, 2025, retrieved from URL <https://www.orbitonline.com/products/cut-off-sprinkler-risers?srsltid=AfmBOorCKBcQnupWZBGKWPmvIeIeIj1ffOIhgFh3PJAKvdRzFerdrAEA>, 9 pages.

Reinders.com [online], "Blazing—Fast Fitting—Spiral Barb/Swing X 17MM Drip Coupling," retrieved on Aug. 28, 2024, retrieved from URL <https://www.reinders.com/blazing-fast-fitting-spiral-barb-swing-x-17mm-drip-coupling/>, 3 pages.

* cited by examiner

WATER IRRIGATION SYSTEMS AND METHODS

TECHNICAL FIELD

This disclosure relates to water irrigation systems and methods and more particularly, water irrigation systems and methods that include a sprinkler head adapter.

BACKGROUND

Water irrigation systems can use a variety of sprinkler head devices to deliver a stream of irrigation water from a water source. Certain sprinkler head devices may output more water per time period (such as in gallons per minute) than other sprinkler head devices. Water conservation is a particularly important consideration in irrigation system design. The ability to replace relatively high water usage sprinkler head devices with relatively low water usage sprinkler head devices can be advantageous.

SUMMARY

In a first example implementation, an irrigation sub-assembly includes a swing joint assembly that includes an inlet connection configured to couple to an irrigation main piping, one or more elbows; one or more straight pipe sections; and an outlet connection. The irrigation main piping is configured to transport an irrigation liquid therethrough. The irrigation sub-assembly includes a sprinkler head adapter that includes an inlet connection configured to threadingly couple directly to the outlet connection and a body integrally formed with the inlet connection. The inlet connection includes a female pipe thread (FPT) connection. The body includes a plurality of riser sections. Each riser section includes a threaded portion. Each threaded portion includes a male pipe thread (MPT) connection. The irrigation sub-assembly includes a pop-up spray nozzle sprinkler device that includes a body that includes an inlet connection configured to threadingly couple directly to a particular threaded portion of the sprinkler head adapter; and a pop-up nozzle configured to emerge from the body and output a volumetric flow of irrigation liquid to an area of a terranean surface.

In an aspect combinable with the first example implementation, the FPT connection is a ¾ inch FPT connection.

In another aspect combinable with one, some, or all of the previous aspects, the outlet connection of the swing joint assembly is a ¾ inch MPT connection.

In another aspect combinable with one, some, or all of the previous aspects, the MPT connection is a ½ inch MPT connection.

In another aspect combinable with one, some, or all of the previous aspects, the inlet connection of the pop-up spray nozzle sprinkler device is a ½ inch FPT connection.

In another aspect combinable with one, some, or all of the previous aspects, the body and the inlet connection are integrally formed of polyethylene thermoplastic.

In another aspect combinable with one, some, or all of the previous aspects, the polyethylene thermoplastic is a High Density Polyethylene (HDPE).

In another aspect combinable with one, some, or all of the previous aspects, the plurality of riser sections is three riser sections, four riser sections, or five riser sections.

In another aspect combinable with one, some, or all of the previous aspects, at least one of the plurality of riser sections includes a cut-off shoulder.

In another aspect combinable with one, some, or all of the previous aspects, the cut-off shoulder forms a thread stop of the threaded portion.

In a second example implementation, a sprinkler head adapter includes a body that includes an inlet connection and a riser. The inlet connection is configured to threadingly couple directly to an outlet connection of a swing joint assembly. The inlet connection includes a ¾ inch female pipe thread (FPT) connection. The riser is integrally formed with the inlet connection and includes a plurality of riser sections. Each riser section includes a threaded portion and a cut-off shoulder. Each threaded portion includes a ½ inch male pipe thread (MPT) connection. The sprinkler head adapter includes a bore formed through the body and configured to flow an irrigation liquid therethrough.

In an aspect combinable with the second example implementation, the inlet connection and the riser are integrally formed of polyethylene thermoplastic.

In another aspect combinable with one, some, or all of the previous aspects, the polyethylene thermoplastic is a High Density Polyethylene (HDPE).

In another aspect combinable with one, some, or all of the previous aspects, the plurality of riser sections is three riser sections, four riser sections, or five riser sections.

In another aspect combinable with one, some, or all of the previous aspects, a length of the riser is between 2¾ inches and 5⅝ inches.

In another aspect combinable with one, some, or all of the previous aspects, the cut-off shoulder forms a thread stop of the threaded portion.

In a third example implementation, a process for replacing a rotary sprinkler head device with a pop-up spray nozzle sprinkler device includes (i) identifying a rotary sprinkler head device that is threadingly coupled to a swing joint assembly that is coupled, under a terranean surface, to a main piping of an irrigation system; (ii) exposing a threaded connection between the rotary sprinkler head device and the swing joint assembly; (iii) unthreading the rotary sprinkler head device from the swing joint assembly to decouple the rotary sprinkler head device from the swing joint assembly; (iv) threadingly connecting a sprinkler head adapter to the threaded connection by threading a ¾ inch female pipe thread connection of the sprinkler head adapter to a ¾ inch male pipe thread connection of the swing joint assembly; and (v) threadingly connecting a pop-up spray nozzle sprinkler device to the sprinkler head adapter by threading a ½ inch female pipe thread connection of the pop-up spray nozzle sprinkler device to a ½ inch male pipe thread connection of the sprinkler head adapter.

In an aspect combinable with the third example implementation, steps (iv) and (v) exclude any modification or adjustment of the swing joint assembly.

In another aspect combinable with one, some, or all of the previous aspects, the ½ inch male pipe thread connection of the sprinkler head adapter includes a threaded portion of a riser section of a plurality of riser sections of the sprinkler head adapter.

In another aspect combinable with one, some, or all of the previous aspects includes (vi) prior to step (iv), removing at least one riser section of the plurality of riser sections from the sprinkler head adapter.

In another aspect combinable with one, some, or all of the previous aspects, step (vi) includes cutting the sprinkler head adapter at a cut-off shoulder to remove the at least one riser section from the sprinkler head adapter.

In another aspect combinable with one, some, or all of the previous aspects, step (ii) includes digging out at least a portion of an underground material that surrounds the rotary sprinkler head device.

Implementations of water irrigation systems and methods according to the present disclosure may include one or more of the following features. For example, implementations according to the present disclosure can provide for efficient and rapid replacement of relatively high water volume usage sprinkler devices, such as rotary head sprinkler devices, with relatively low water volume usage sprinkler devices, such as pop-up spray nozzle sprinkler devices through a sprinkler head adapter. As another example, implementations according to the present disclosure can replace rotary head sprinkler devices with pop-up spray nozzle sprinkler devices without cutting or otherwise modifying a swing joint that is coupled to an irrigation main piping system through a sprinkler head adapter.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes example implementations of an irrigation system sub-assembly and sprinkler head adapter used therein to provide irrigation liquid (e.g., water) from a main water source to an area of a terranean surface. In example implementations, the sprinkler head adapter can be used to directly couple an outlet of a swing joint assembly to a pop-up spray nozzle sprinkler device (i.e., a "pop-up sprinkler head") subsequent to removal of a rotary head sprinkler device from the outlet of the swing joint assembly. The sprinkler head adapter, in example aspects, can directly (e.g., threadingly) couple the outlet of the swing joint assembly to the pop-up sprinkler head without adjusting (e.g., cutting or otherwise modifying) the swing joint assembly. In so doing, the sprinkler head adapter of the present disclosure can eliminate a need to modify the outlet of the swing joint assembly when replacing a relatively high water volume usage sprinkler device, such as a rotary head sprinkler device, with a relatively low water volume usage sprinkler devices, such as the pop-up sprinkler head. Conventionally, replacing a rotary head sprinkler device with a pop-up sprinkler head requires cutting and removal of at least a portion of the swing joint assembly that includes the outlet (typically a ¾ inch MPT connection) and attaching (with PVC cement) a new outlet (typically a ½ inch MPT connection). With the sprinkler head adapter according to the present disclosure, such modification is unnecessary.

Figure 1:
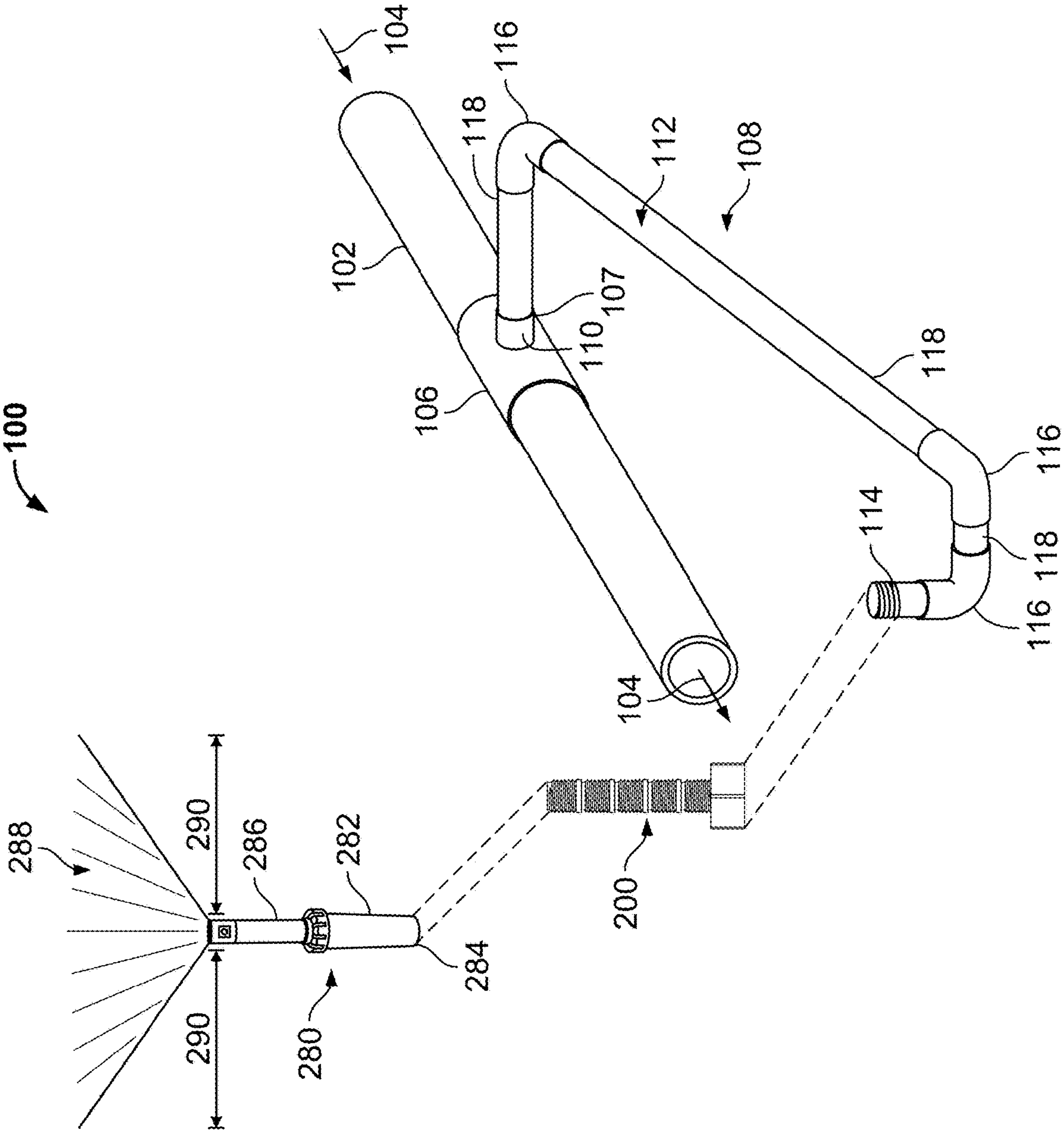
FIG. 1 is a schematic diagram of an example implementation of an irrigation sub-assembly that includes a sprinkler head adapter according to the present disclosure.

FIG. 1 is a schematic diagram of an example implementation of an irrigation sub-assembly 100 that includes a sprinkler head adapter 200 according to the present disclosure. In the example shown in FIG. 1, the irrigation sub-assembly 100 includes a main piping 102 (a portion of which is shown) that carries or transports irrigation liquid 104 (e.g., water 104) therethrough. Generally, the main piping 102 carries the water 104 from a source of the irrigation water, underground (e.g., beneath a terranean surface), and to multiple sprinkler devices that are fluidly coupled to the main piping 102 in an irrigation system (of which the irrigation sub-assembly 100 is at least a portion thereof). The main piping 102 is often comprised of multiple joints of polyvinylchloride (PVC), such as Schedule 40 PVC that is nominal ¾ inch or 1 inch in diameter. However, main piping 102 can be comprised of other tubing, such as copper, poly tubing, Schedule 80 PVC, or other material as appropriate for the irrigation system (e.g., due to pressure, type of irrigation liquid, or otherwise).

As shown in this example, a tee 106 (or tee-connector 106) is coupled (e.g., with PVC cement) within the main piping 102 with an outlet 110 to which a swing joint assembly 108 connects. The illustrated swing joint assembly 108 is comprised of straight pipes 118 and elbows 116 that a coupled together (e.g., pre-assembled) to provide an adjustable connection from the main piping 102 to a sprinkler head device. Generally, the swing joint assembly 108, like the main piping 102, is installed underground beneath a terranean surface.

The swing joint assembly 108 includes an inlet connection 107 that, generally, is a ¾ inch or 1 inch MPT connector. The inlet connection 107 is connected (threadingly) into the outlet 110 of the tee 106, which, generally, is a ¾ inch or 1 inch FPT connector. As illustrated in this example, the swing joint assembly 108 includes an outlet connection 114. Outlet connection 114, generally, is a ¾ inch MPT connection. Conventionally, when the swing joint assembly 108 is connected (at outlet connection 114) with a rotary head sprinkler device (described more fully with reference to FIGS. 3A-3C), the rotary head sprinkler device is directly threaded to the outlet connection 114 of the swing joint assembly 108.

Figure 2C:
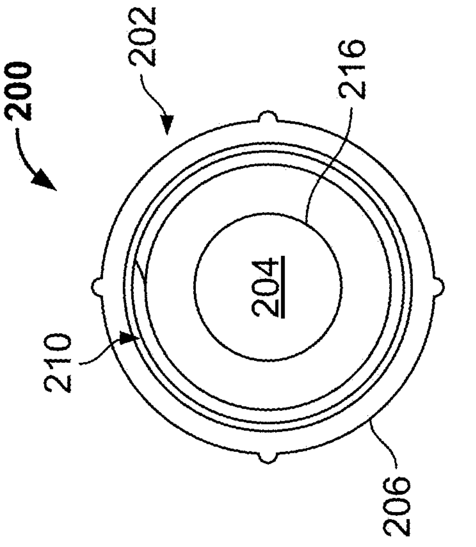
FIGS. 2A-2D are schematic diagrams of an example implementation of a sprinkler head adapter according to the present disclosure.
Figure 2D:
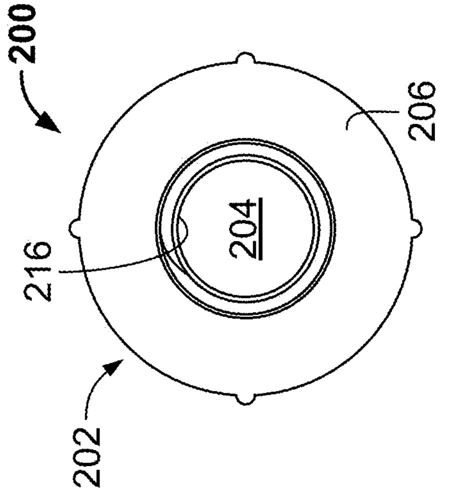
Figure 2B:
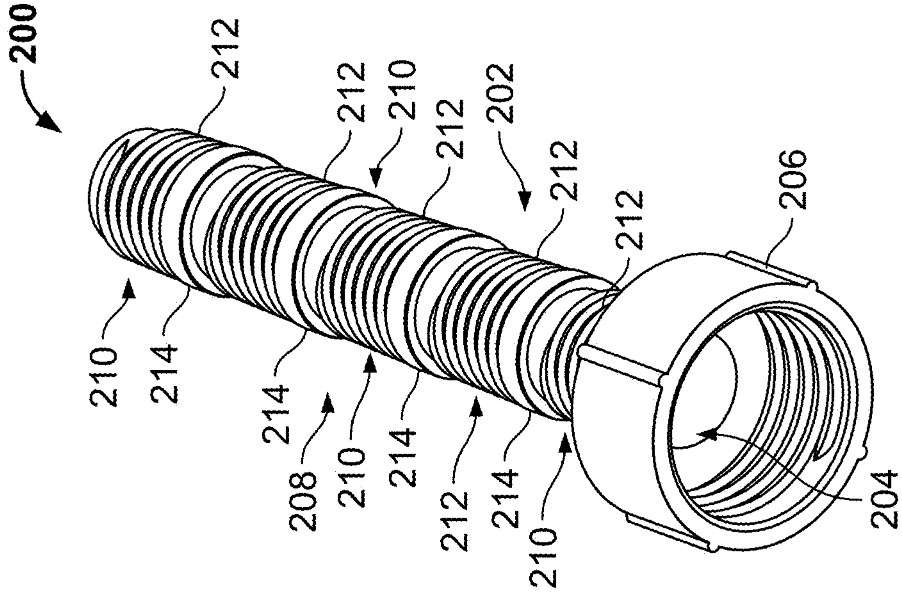
Figure 2A:
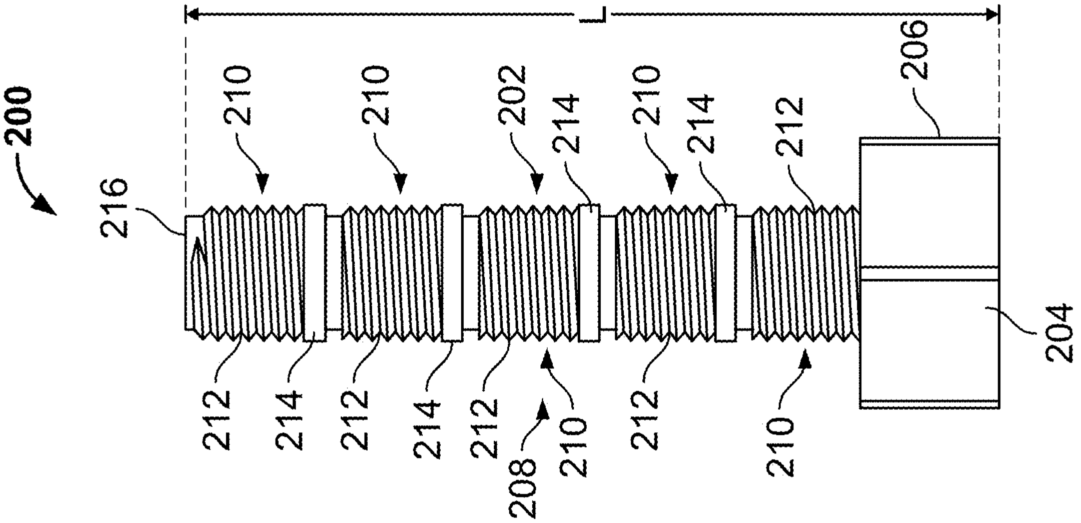

As shown in FIG. 1, a sprinkler head adapter 200 can be directly coupled (threadingly) to the outlet connection 114 of the swing joint assembly 108. The sprinkler head adapter 200 can also be directly coupled (threadingly) to a pop-up sprinkler head 280. Turning now to FIGS. 2A-2D, these figures show schematic diagrams of an example implementation of the sprinkler head adapter 200 according to the present disclosure. FIG. 2A shows a side view of the sprinkler head adapter 200; FIG. 2B shows an isometric view of the sprinkler head adapter 200; FIG. 2C shows a bottom view of the sprinkler head adapter 200; and FIG. 2D shows a top view of the sprinkler head adapter 200.

In this example implementation, the sprinkler head adapter 200 includes a body 202 that includes an inlet connection 206 and a riser 208. The inlet connection 206 and riser 208 are integrally formed together to form the body 202, such as with High Density Polyethylene (HDPE) or another polyethylene thermoplastic (which can be extruded or otherwise shaped into the body 202). In this example, the riser 208 includes multiple (e.g., three or more) riser sections 210. Each riser section 210 includes a threaded portion 212 and a cut-off shoulder 214. In this example implementation, each threaded portion 212 forms a ½ inch MPT.

The cut-off shoulder 214 can serve two functions. For instance, the cut-off shoulder 214 serves as a stop past which a sprinkler device cannot be threaded onto the riser 208. Also, the cut-off shoulder 214 provides a location at which a portion of the riser 208 can be removed (i.e., cut off) to adjust a total length, L, of the riser 208, which in turn can adjust a height of a sprinkler device that is threaded onto the riser 208 relative to a terranean surface. Thus, in this example, the riser 208 includes five riser sections 210. Each riser section 210 includes the threaded portion 212 and the cut-off shoulder 214 (with the inlet connection 206 serving as the cut-off shoulder on the riser section 210 directly adjacent the inlet connection 206). The number of riser sections 210 can be adjusted from five, to four, to three, to two, to one riser section 210 by cutting the riser 208 at a particular cut-off shoulder 214, thereby removing one, two, three, or four riser sections 210 as needed. In alternative embodiments, the riser 208 can have two riser sections 210, three riser sections 210, four riser sections 210, or more than five riser sections 210. In the example implementation of sprinkler head adapter 200, the length, L, can be between 2¾ inches long (for a riser 208 with three riser sections 210) and 5⅝ inches long (for a riser 208 with five riser sections 210).

In this example, a bore 204 extends from the inlet connection 206 to an outlet 216 of the body 202. The bore 204 comprises a flowpath for irrigation liquid (i.e., water 104) to flow from the swing joint assembly 108, through the sprinkler head adapter 200, and to a sprinkler device (such as the pop-up sprinkler head 280 shown in FIG. 1).

The inlet connection 206, in this example, is a ¾ inch FPT connection. As a ¾ inch FPT connection, the inlet connection 206 can directly thread to a ¾ inch MPT connection of the swing joint assembly 108 (specifically, the outlet connection 114). Thus, no additional component or adapter is needed to connect the outlet connection 114 to the inlet connection 206.

Returning to FIG. 1, as shown in this example of the irrigation sub-assembly 100, a pop-up spray nozzle 280 can be directly connected (e.g., threadingly) to the sprinkler head adapter 200 (at the outlet 216). In this example, the pop-up spray nozzle 280 includes a body 282 that comprises an inlet connection 284 and contains a pop-up nozzle 286 that emerges from the body 282 upon a pressurized flow of the water 104 and releases the water 104 as a circular (or partially circular) spray 288. As shown in this example, the circular spray 288 of the water 104 extends a radius 290 from the pop-up nozzle 286 and in a particular area (e.g., between 90 degrees and 360 degrees or other portion of a circular area) about the pop-up nozzle 286.

In this example, the inlet connection 284 is a ½ inch FPT connection, which can directly thread onto a threaded portion 212 of the riser section 210. Thus, in this example, the body 282 of the pop-up spray nozzle 280 can thread onto the sprinkler head adapter 200 without any intervening or additional component (e.g., directly).

Figure 3A:
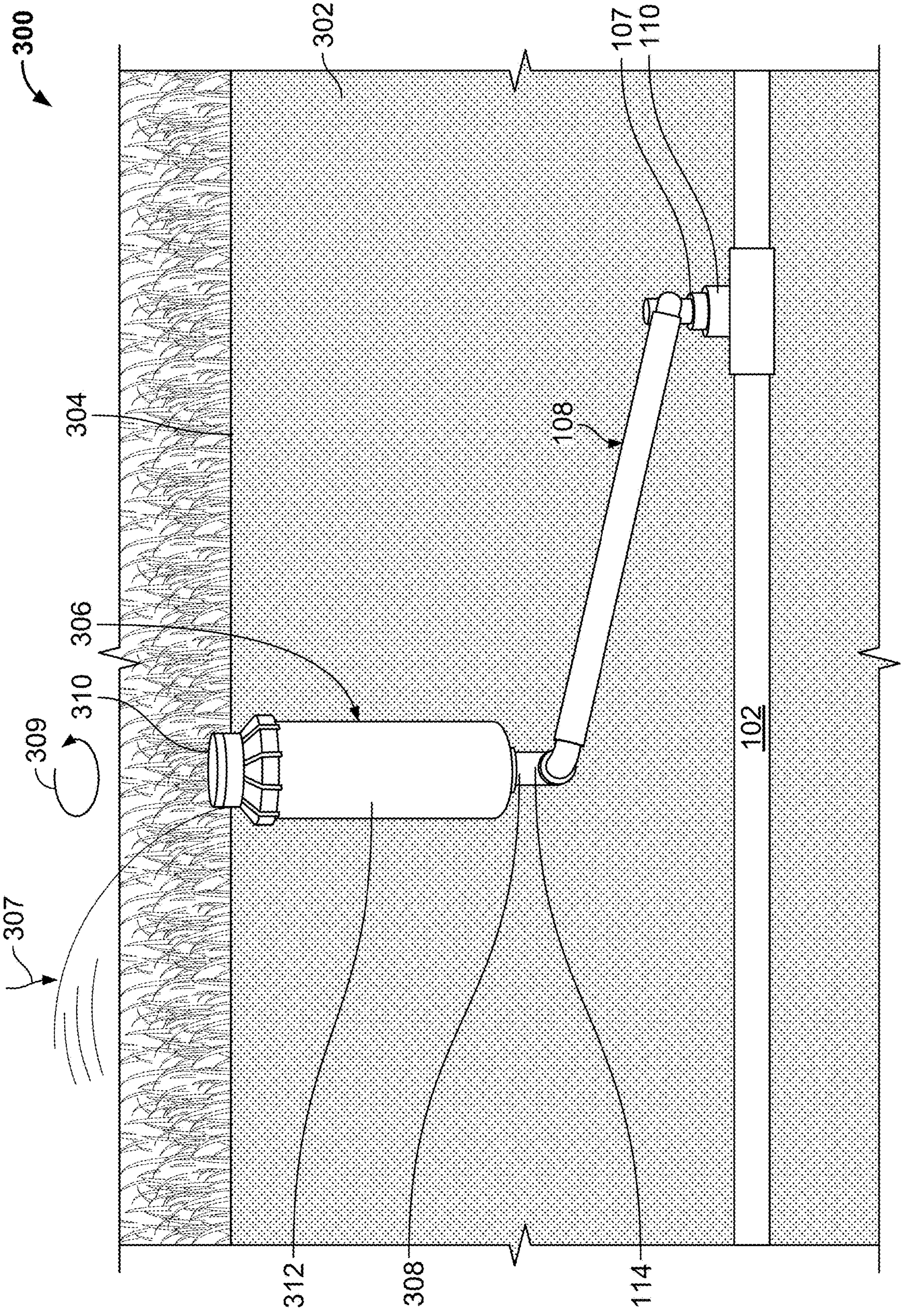
FIGS. 3A-3C are schematic diagrams of an example process for replacing a rotary head sprinkler device with a pop-up spray nozzle sprinkler device according to the present disclosure.
Figure 3B:
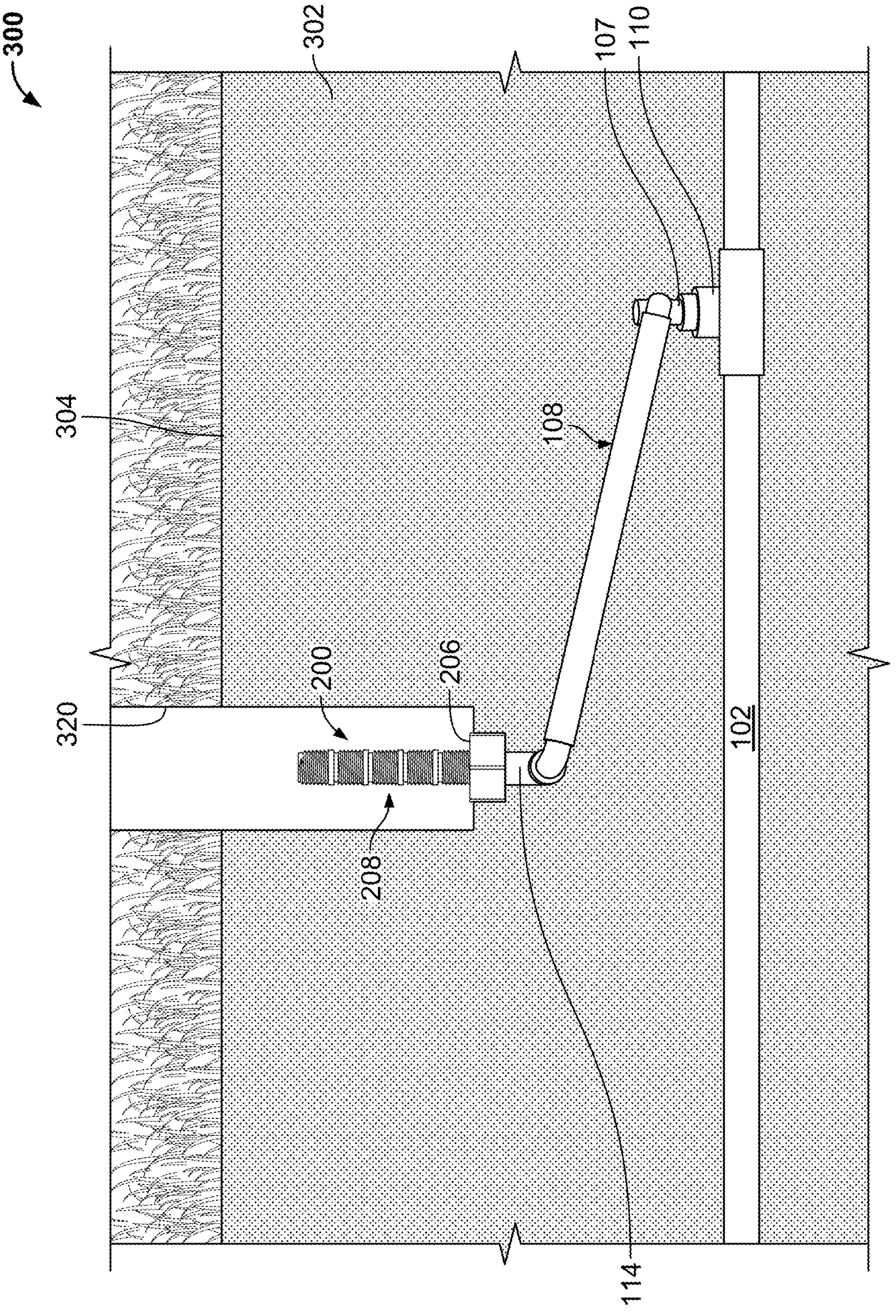
Figure 3C:
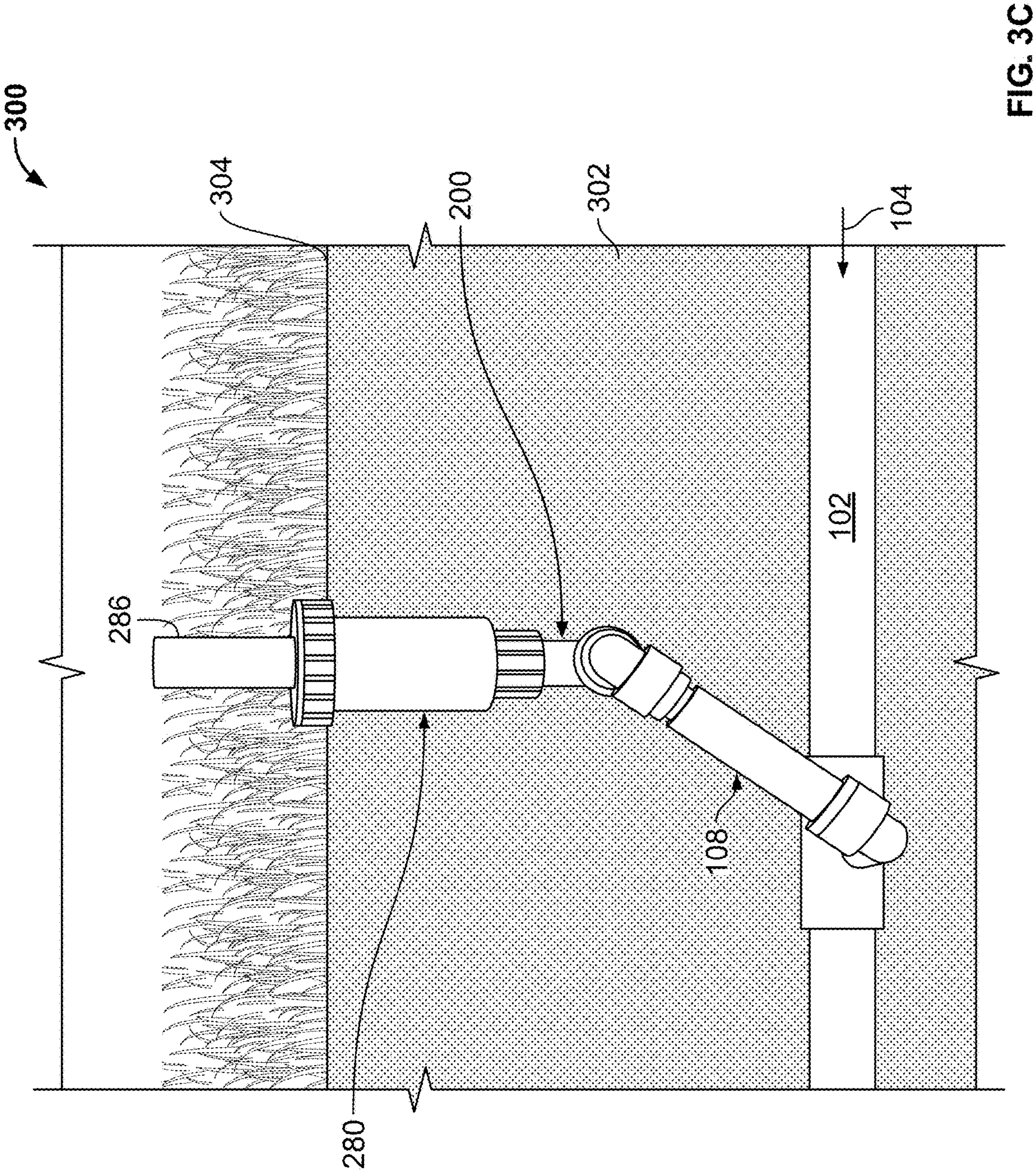

FIGS. 3A-3C are schematic diagrams of an example process 300 for replacing a rotary head sprinkler device with a pop-up spray nozzle sprinkler device according to the present disclosure. In some aspects, replacing a rotary head sprinkler device with a pop-up spray nozzle sprinkler device can result in water conservation, as a rotary head sprinkler device generally uses more water (e.g., volume flow output over time) as compared to a pop-up spray nozzle sprinkler device. Thus, replacement of a rotary head sprinkler device with a pop-up spray nozzle sprinkler device can be desirable but, in a conventional process, requires adjustment of a swing joint assembly (e.g., cutting and cementing a different outlet onto a swing pipe) in order to connect the new pop-up spray nozzle sprinkler device after removal of the rotary head sprinkler device.

Process 300, as illustrated, allows an irrigation professional to replace a rotary head sprinkler device with a pop-up spray nozzle sprinkler device without adjusting the swing joint assembly (e.g., cutting and cementing a different outlet onto a swing pipe) in order to connect the new pop-up spray nozzle sprinkler device after removal of the rotary head sprinkler device. This is accomplished by the addition of a sprinkler head adapter according to the present disclosure.

FIG. 3A illustrates a first step in the process 300, which includes identifying an existing rotary head sprinkler device 306 that is installed on a swing joint assembly 108 that is, in turn, connected to a main piping 102 underground 302 (i.e., underneath a terranean surface 304). As shown in this figure, the rotary head sprinkler device 306 includes a body 312 with an inlet connection 308 that is directly threaded on the outlet connection 114 of the swing joint assembly 108. The body 312 includes a rotary sprinkler head 310 that outputs an arc 307 of irrigation liquid (e.g., water 104). During operation of the rotary sprinkler head 310, the arc 307 rotates about a 360 degree path 309 to provide irrigation liquid to a circular area of the terranean surface 304. Thus, in contrast to a pop-up head sprinkler device, which delivers a spray of water to a circular area of water (360 degrees simultaneously), the arc 307 of irrigation liquid moves over a time duration (in the 360 degree path 309) to provide irrigation liquid to the circular area.

FIG. 3B illustrates a second step in the process 300, which includes digging a hole 320 from the terranean surface 304 and removing the existing rotary head sprinkler device 306 that is installed on the swing joint assembly 108. Removing the existing rotary head sprinkler device 306 includes unthreading the body 312 from the outlet connection 114 of the swing joint assembly 108. This second step, as shown in FIG. 3B, includes installing the sprinkler head adapter 200 to the outlet connection 114. In this example, installing the sprinkler head adapter 200 to the outlet connection 114 includes directly threading the inlet connection 206 (as a ¾ inch FPT) to the outlet connection 114 (as a ¾ inch MPT). In some aspects, no modification of the swing joint assembly 108 (including no modification to the outlet connection 114) is needed or performed in order to install (e.g., threadingly) the sprinkler head adapter 200 to the outlet connection 114.

In some aspects, the process 300 includes adjusting a number of riser sections 210 on the sprinkler head adapter 200. For example, if the sprinkler head adapter 200 originally has five riser sections 210, one or more of the riser sections 210 can be removed by cutting the riser 208 at a particular cut-off shoulder 214 to shorten the riser 208 so as to position a new pop-up sprinkler device 280 at or level with (or slightly beneath) the terranean surface 304 when installed on the sprinkler head adapter 200.

FIG. 3C illustrates a third step in the process 300, which includes installing the new pop-up spray nozzle sprinkler device 280 on the sprinkler head adapter 200 and, if necessary, filling in the hole 320 with dirt or soil. In this step, installing the new pop-up spray nozzle sprinkler device 280 on the sprinkler head adapter 200 includes directly threading the inlet connection 284 (shown in FIG. 1) of the pop-up spray nozzle sprinkler device 280 onto a threaded portion 212 of a riser section 210 of the sprinkler head adapter 200. In this example, the inlet connection 284 is a ½ inch FPT connection, while the threaded portion 212 is a ½ inch MPT connection; thus, no further component is needed between the pop-up spray nozzle sprinkler device 280 and the sprinkler head adapter 200. Subsequent to this third step, the pop-up spray nozzle sprinkler device 280 is operable to irrigate the terranean surface 304 once water 104 is provided to the main piping 102, through the sprinkler head adapter 200, and to the pop-up spray nozzle sprinkler device 280.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A process for replacing a rotary sprinkler head device with a pop-up spray nozzle sprinkler device, comprising:

(i) identifying a rotary sprinkler head device that is threadingly coupled to a swing joint assembly that is coupled, under a terranean surface, to a main piping of an irrigation system;

(ii) exposing a threaded connection between the rotary sprinkler head device and the swing joint assembly;

(iii) unthreading the rotary sprinkler head device from the swing joint assembly to decouple the rotary sprinkler head device from the swing joint assembly;

(iv) threadingly connecting a sprinkler head adapter to the threaded connection by threading a ¾ inch female pipe thread connection of the sprinkler head adapter to a ¾ inch male pipe thread connection of the swing joint assembly; and (v) threadingly connecting a pop-up spray nozzle sprinkler device to the sprinkler head adapter by threading a ½ inch female pipe thread connection of the pop-up spray nozzle sprinkler device to a ½ inch male pipe thread connection of the sprinkler head adapter.

2. The process of claim 1, wherein steps (iv) and (v) exclude any modification or adjustment of the swing joint assembly.

3. The process of claim 1, wherein the ½ inch male pipe thread connection of the sprinkler head adapter comprises a threaded portion of a riser section of a plurality of riser sections of the sprinkler head adapter.

4. The process of claim 3, comprising:

(vi) prior to step (iv), removing at least one riser section of the plurality of riser sections from the sprinkler head adapter to adjust a height of the sprinkler head adapter relative to the terranean surface.

5. The process of claim 4, wherein step (vi) comprises cutting the sprinkler head adapter at a cut-off shoulder to remove the at least one riser section from the sprinkler head adapter.

6. The process of claim 1, wherein step (ii) comprises digging out at least a portion of an underground material that surrounds the rotary sprinkler head device.

7. The process of claim 1, wherein the rotary sprinkler head device comprises a sprinkler device having a first water volume usage.

8. The process of claim 1, wherein the pop-up spray nozzle sprinkler device comprises a sprinkler device having a second water volume usage less than the first water volume usage.

9. The process of claim 1, comprising:

operating the irrigation system to output an arc of an irrigation liquid that rotates about a path to provide the irrigation liquid to a circular area of the terranean surface.

10. The process of claim 1, wherein the path comprises about a 360 degree path.

11. The process of claim 1, comprising:

operating the irrigation system to output operating the pop-up spray nozzle sprinkler device to output a volumetric flow of an irrigation liquid to an area of the terranean surface over a time duration.

12. The process of claim 1, wherein the sprinkler head adapter comprises a body integrally formed with the ¾ inch female pipe thread connection.

13. The process of claim 12, wherein the body is integrally formed of polyethylene thermoplastic.

14. The process of claim 13, wherein the polyethylene thermoplastic is High Density Polyethylene (HDPE).

15. The process of claim 1, wherein the ½ inch male pipe thread connection of the sprinkler head adapter comprises three riser sections, four riser sections, or five riser sections.

16. The process of claim 1, comprising operating irrigation system to raise a pop-up nozzle of the pop-up spray nozzle sprinkler device from a body of the pop-up spray nozzle sprinkler device upon a pressurized flow of the water.

17. The process of claim 16, wherein the sprinkler head adapter comprises a bore formed through the body and configured to flow an irrigation liquid therethrough.

18. The process of claim 17, wherein the bore extends from the ¾ inch female pipe thread connection to an outlet of the pop-up spray nozzle sprinkler device.

19. The process of claim 1, wherein the body is integrally formed of is HDPE.

20. The process of claim 1, wherein the sprinkler head adapter comprises a bore formed through the body and configured to flow an irrigation liquid therethrough.

* * * * *